United States Patent [19]

Sturman

[11] Patent Number: 5,471,959
[45] Date of Patent: Dec. 5, 1995

[54] PUMP CONTROL MODULE

[76] Inventor: Oded E. Sturman, 3973 Santa Monica Ct., Newbury Park, Calif. 91320

[21] Appl. No.: 298,939

[22] Filed: Aug. 31, 1994

[51] Int. Cl.$^6$ ................................................. F02M 37/04
[52] U.S. Cl. ........................... 123/447; 123/497; 123/456
[58] Field of Search .................................. 123/447, 467, 123/506, 497, 456, 458

[56] References Cited

U.S. PATENT DOCUMENTS

| | | | |
|---|---|---|---|
| 3,753,426 | 8/1973 | Lilley | 123/447 |
| 3,827,409 | 8/1974 | O'Neill | 123/447 |
| 4,161,964 | 7/1979 | Greiner | 123/447 |
| 4,422,424 | 12/1983 | Luscomb | 123/447 |
| 4,829,964 | 5/1989 | Asayama | 123/458 |
| 4,877,187 | 10/1989 | Daly | 123/447 |
| 4,957,084 | 9/1990 | Kramer | 123/447 |
| 5,085,193 | 2/1992 | Morikawa | 123/497 |
| 5,207,201 | 5/1993 | Schlagmuller | 123/447 |

*Primary Examiner*—Carl S. Miller
*Attorney, Agent, or Firm*—Blakely, Sokoloff, Taylor & Zafman

[57] ABSTRACT

A pump module that controls and varies the pressure of a fluid within a hydraulic system. The module includes a housing which has an inlet port, an outlet port and a return port. The inlet port is typically coupled to a pump. The return port is typically connected to a fluid reservoir. The outlet port is typically connected to a working device such as the fuel injector of an internal combustion engine. The module contains a spring loaded variable volume accumulator which maintains the fluid pressure at the outlet of the module. The module also has a three-way valve that provides fluid communication between the inlet port and the outlet port when in a first position, and fluid communication between the inlet port and the return port when in a second position. The module further includes a pressure transducer that senses the fluid pressure at the outlet port and provides a corresponding pressure feedback signal to an electronic controller. The electronic controller moves the three-way valve to the second position when the outlet fluid pressure exceeds a threshold value. Opening the valve allows the fluid provided by the pump to be directed to the reservoir through the return port, thereby bypassing the working device. Shorting the pump output to the reservoir reduces the work required by the pump. The fluid pressure within the system can be changed by varying the threshold value.

8 Claims, 4 Drawing Sheets

5,471,959

PUMP CONTROL MODULE

BACKGROUND OF THE INVENTION

1. Field of the Invention

The present invention relates to a pump module that regulates the fluid pressure of a hydraulic system.

2. Description of Related Art

Some internal combustion engines contain fuel injectors that inject a highly pressurized spray of fuel into the combustion chamber. Fuel injectors are frequently used in combustion ignition engines which run on diesel fuel. Fuel injectors typically contain a spring return hydraulically driven intensifier that increases the pressure of the fuel. The energy that drives the intensifier is provided by a working fluid that is pressurized by an external pump. The flow of working fluid into the fuel injector is controlled by a solenoid control valve that is switched between open and closed positions by an electronic controller. In an engine with multiple fuel injectors, the continuous opening and closing of the control valves may cause variations in the pressure of the working fluid.

FIG. 1 shows a prior art fuel system for an internal combustion engine. Each fuel injector 2 has an accumulator 4 that compensates for instantaneous changes in oil pressure. The accumulator 4 is coupled to a pump 6. The pump 6 and injector 2 are connected to an oil pan 8 to complete the loop. Coupled to the output of the pump 6 is an electronic relief valve 9. The relief valve 9 contains an electronically controlled throttle valve which can vary the pressure drop across the valve. The electronic relief valve is connected to a central engine microcontroller.

To decrease the oil pressure of the system, the microcontroller provides a signal to close the throttle valve and increase the pressure drop across the relief valve. Likewise to increase the pressure within the system, the throttle valve is opened to decrease the pressure drop across the relief valve. In the prior art system the pump still provides the same amount of work even when the system oil pressure is varied by the relief valve. Pump work tends to reduce the energy efficiency of the engine and the life of the pump. It would therefore be desirable to have a fluid pressure control system for an internal combustion engine that reduces the work requirement of the pump when energy from the pump is not required.

SUMMARY OF THE INVENTION

The present invention is a pump module that controls and varies the pressure of a fluid within a hydraulic system. The module includes a housing which has an inlet port, an outlet port and a return port. The inlet port is typically coupled to a pump. The return port is typically connected to a fluid reservoir. The outlet port is typically connected to a working device such as the fuel injector of an internal combustion engine. The module contains a spring loaded variable volume accumulator which maintains the fluid pressure at the outlet of the module. The module also has a three-way valve that provides fluid communication between the inlet port and the outlet port when in a first position, and fluid communication between the inlet port and the return port when in a second position. The module further includes a pressure transducer that senses the fluid pressure at the outlet port and provides a corresponding pressure feedback signal to an electronic controller. The electronic controller moves the three-way valve to the second position when the outlet fluid pressure exceeds a threshold value. Opening the valve allows the fluid provided by the pump to be directed to the reservoir through the return port, thereby bypassing the working device. Shorting the pump output to the reservoir reduces the work required by the pump. The fluid pressure within the system can be changed by varying the threshold value.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
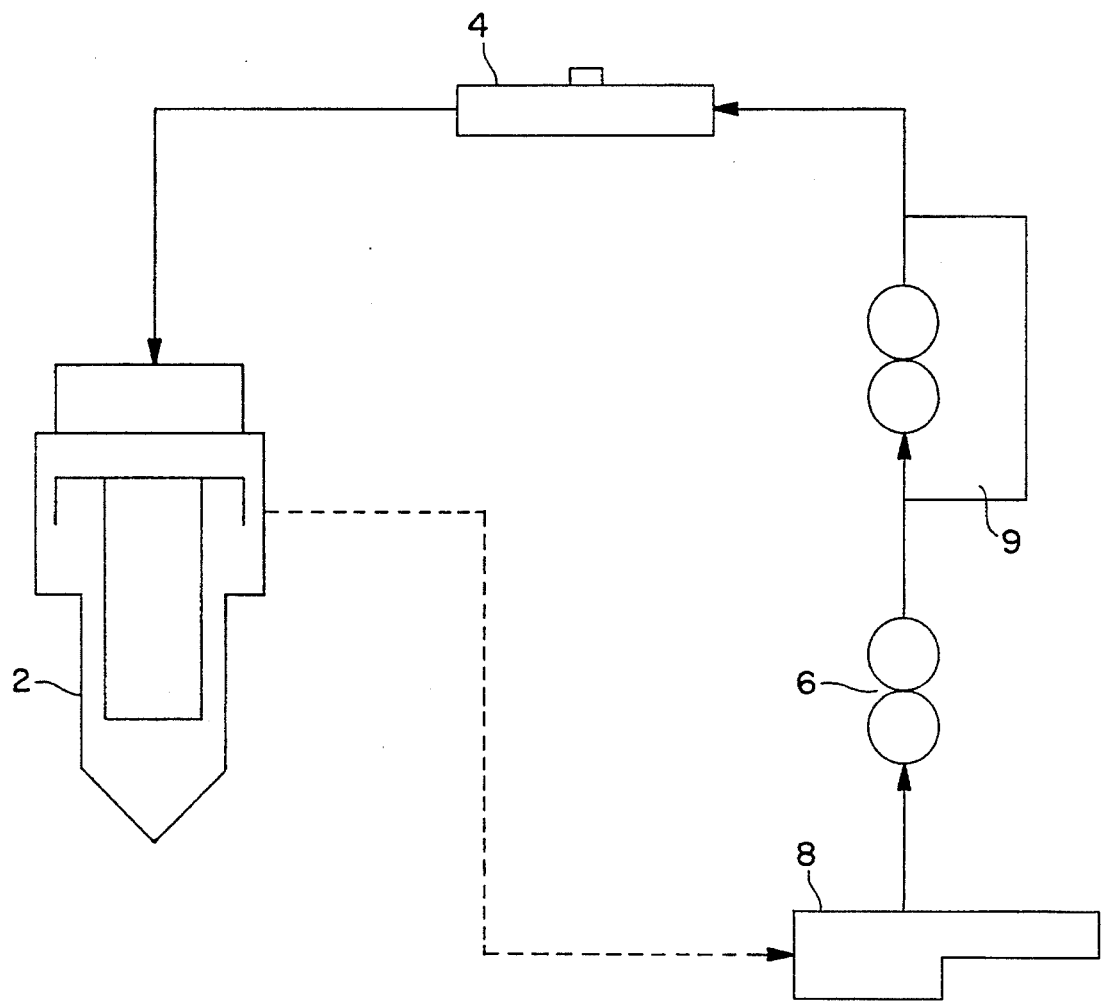
FIG. 1 is a schematic of a fuel injector system of the prior art.
Figure 2:
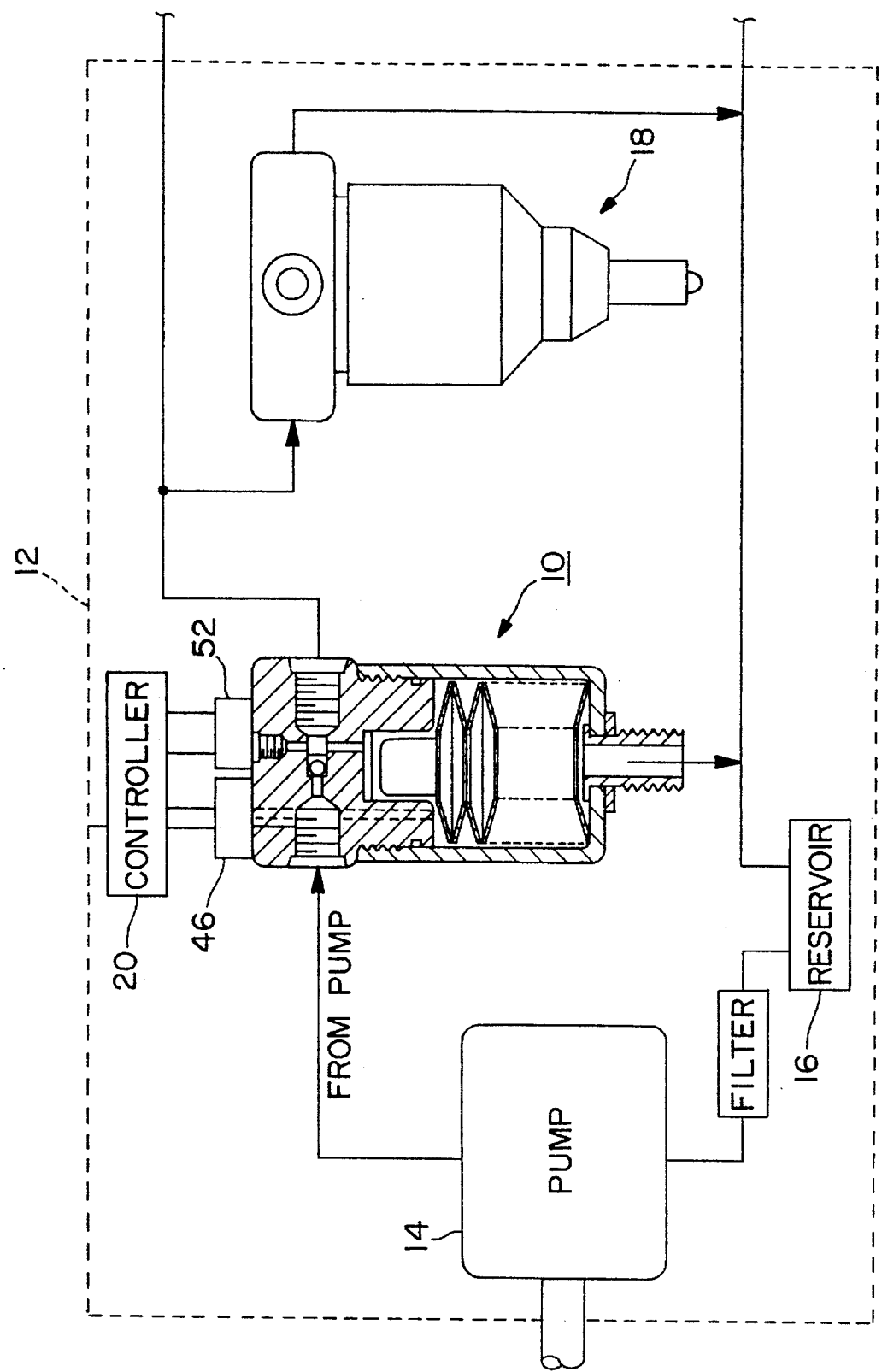
FIG. 2 is a schematic of a pump module within an hydraulic system.

Referring to the drawings more particularly by reference numbers, FIG. 2 is a schematic showing a pump module 10 of the present invention within a hydraulic system 12. The system 12 typically contains a pump 14, a fluid reservoir 16 and a working device(s) 18 such as a fuel injector. The pump 14 may be a positive displacement pump. The reservoir 16 may be a simple tank. The module 10 may be connected to an electronic controller 20. The controller 20 is typically microprocessor based and may-control other devices within the system 10, such as the injector 18. Although a hydraulic system with a pump, etc. is shown and described, it is to be understood that the module 10 of the present invention can be used in any system where a fluid pressure is to be controlled.

Figure 3:
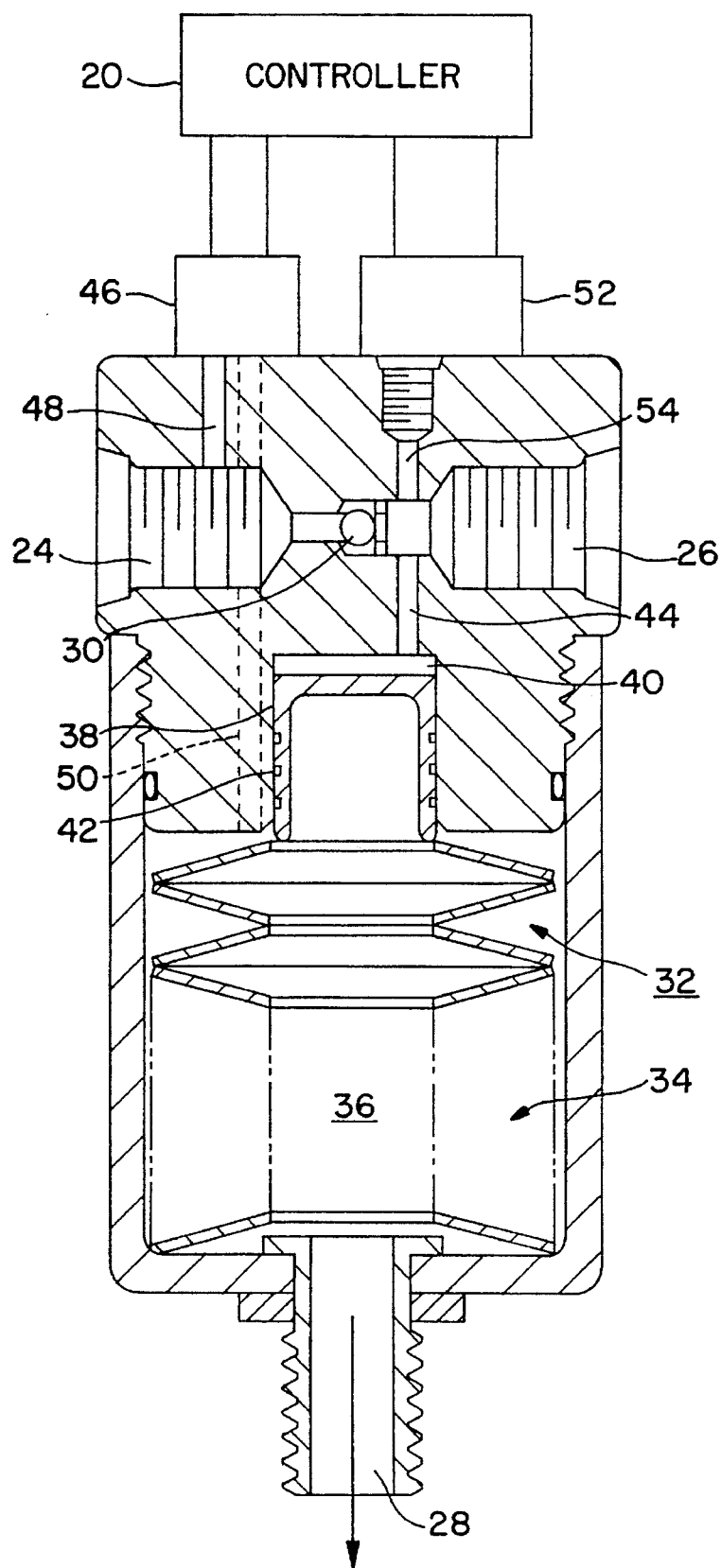
FIG. 3 is a cross-sectional view of the pump module.

As shown in FIG. 3, the pump module 10 includes a housing 22 which has an inlet port 24, an outlet port 26 and a return port 28. The module 10 typically has a one-way check valve 30 located between the inlet port 24 and the outlet port 26 to prevent a reverse flow of fluid into the inlet 24. The inlet port 24 is connected to the pump 14. The outlet port 24 is typically connected to the working device 18. The return port 28 is coupled to the reservoir 16. The housing 22 is typically constructed from two separate pieces to reduce the complexity and cost of manufacturing the unit.

The pump module 10 has a variable volume accumulator assembly 32 which maintains the fluid pressure at the outlet 26 of the module 10. The accumulator 32 contains a plurality of washer springs 34 stacked within a spring chamber 36 of the housing 22. The spring chamber 36 is in fluid communication with the return port 28 so that any fluid within the chamber 36 can flow to the reservoir 16. The spring washers 34 are coupled to a piston 38 that can move within an accumulator chamber 40. The piston 38 is typically sealed to the housing 22 by O-rings 42. A first regulator channel 44 couples the accumulator chamber 40 with the outlet port 26. The force of the springs 34 exerts a pressure on the fluid within the accumulator chamber 40 and the outlet port 26.

The module 10 also has a control valve 46 that is coupled to the inlet port 24 by a first valve channel 48 and to the spring chamber 36 by a second valve channel 50. The valve 46 is preferably a two-way solenoid valve that can switch between an open position and a closed position. When the valve 46 is in the open position the inlet port 24 is in fluid communication with the spring chamber 36 and the return port 28. The inlet port 24 is not in fluid communication with the spring chamber 36 when the control valve 46 is closed. The valve 46 is typically switched between the open and closed positions by the electronic controller 20. Opening the valve 46 directs the fluid from the pump 14 back to the reservoir 16, thereby bypassing the working device 18.

The module 10 further includes a pressure transducer 52 that is coupled to the outlet port 26 by a second regulator channel 54. The pressure transducer 52 provides a feedback signal that corresponds to the fluid pressure within the outlet port 26. The feedback signal is sent to the electronic controller 20. The controller 20 receives the feedback signal and compares the corresponding fluid pressure of the outlet port 26 with a threshold value. If the outlet port fluid pressure exceeds the threshold value, the controller 20 opens the control valve 46 and bypasses the fluid to the reservoir 16. The controller 20 is programmable so that the threshold value can be varied. For example, the controller 20 may receive system feedback signals relating to temperature and other system characteristics that are processed in accordance with an algorithm by the controller 20. The controller 20 may change the threshold value and corresponding system fluid pressure dependent upon the values of the characteristics. In this manner the controller 20 can change the pressure of the fluid within the system. Although a controller 20 is shown and described, it is to be understood that the pressure transducer 52 can be connected directly to the valve 46 without a controller 20.

In operation, the pump 14 pumps the fluid into the inlet port 24 of the module 10. The fluid passes through the check valve 30 and out of the outlet port 26 to the working device 18. The accumulator 32 will compensate for any variations on the load of the hydraulic system. For example, if the working device 18 is a fuel injector with a solenoid control valve, the injector will create a drop in pressure when the solenoid valve is opened. The accumulator 32 will compensate for the opening of the injector valve and maintain the fluid pressure within the system, so that there is not a reduction in fluid pressure when the next injector valve is opened.

It may be desirable to vary the pressure of the fluid to change the pressure of the fuel injected into the combustion chambers. The controller 20 can vary the system pressure by manipulating the control valve 46 and changing the output pressure of the module 10. What is thus provided is a pump module that can both control and vary the pressure of a fluid within an hydraulic system.

Figure 4:
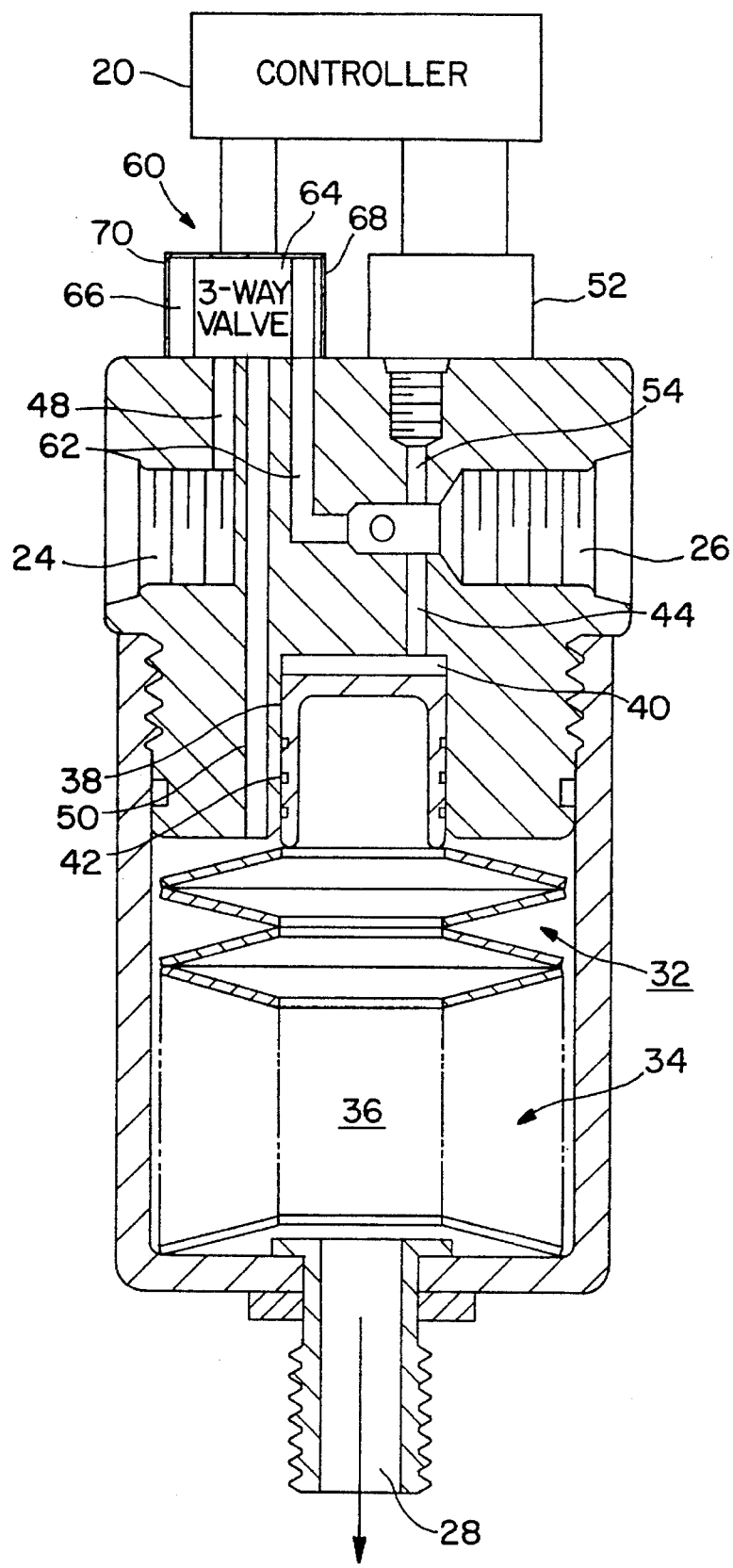
FIG. 4 is a cross-sectional view of an alternate embodiment of a pump module which has a three-way control valve.

FIG. 4 shows a preferred embodiment of a pump module which has a three-way control valve 60 connected to the controller 20. The control valve 60 is coupled to the inlet port 24 by channel 48, to spring chamber 36 by channel 50 and to outlet port 26 by channel 62.

The control valve 60 contains a spool 64 that is coupled to a first solenoid 66 and a second solenoid 68. The solenoids 66 and 68, and spool 64 are located within a valve housing 70. When the first solenoid 66 is energized, the spool 64 is moved to a first position, wherein the inlet port 24 is in fluid communication with the outlet port 26. When the second solenoid 68 is energized, the spool 64 is moved to a second position, wherein the inlet port 24 is in fluid communication with the spring chamber 36 and return port 28.

The solenoids 66 and 68 are energized by a short digital pulse from the controller 20. The spool 64 and housing 70 are preferably constructed from a magnetic material such as a 52100 or 440c hardened steel. The magnetic steel material has enough residual magnetism to maintain the position of the spool even when power to the solenoid has terminated. The valve therefore operates as a digital latch. It being understood that the two-way control valve 46 may also be a digitally latching valve.

In operation, the spool 64 is in the first position so that the output of the pump 14 is provided to the working devices 18. When the sensor 52 detects an excessive system pressure, the controller 20 provides a digital pulse to energize the second solenoid 68 and move the spool 64 to the second position. The output of the pump 14 is directed to the reservoir 16. By-passing the output of the pump 12 to the reservoir 16 reduces the amount of work required by the pump 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A pump module that control a pressure of a fluid system, comprising:

a housing with an inlet port, an outlet port, a return port, an accumulator chamber, a spring chamber in fluid communication with said return port, a first channel in fluid communication with said inlet port, and a second channel in fluid communication with said spring chamber;

an accumulator piston located within said accumulator chamber;

a spring that is located in said spring chamber and which biases said piston;

a control valve coupled to said first channel and said second channel, said control valve allowing fluid communication between said inlet port and said return port when said control valve is in a first position; and, a pressure transducer coupled to said outlet port and said control valve such that said control valve moves to the first position when a fluid pressure in said outlet port exceeds a threshold level.

2. An hydraulic system, comprising:

a pump;

a fluid reservoir;

a housing with an inlet port coupled to said pump, an outlet port a return port, an accumulator chamber, a spring chamber in fluid communication with said return port, a first channel in fluid communication with said inlet port, and a second channel in fluid communication with said spring chamber, coupled to said fluid reservoir;

an accumulator piston located within said accumulator chamber;

a spring that is located in said spring chamber and which biases said piston;

a control valve coupled to said first channel and said second channel, said control valve allowing fluid communication between said inlet port and said outlet port when said control valve is in a first position; and, a pressure transducer coupled to said outlet port and said control valve such that said control valve moves to the first position when a fluid pressure in said outlet port exceeds a threshold level.

3. The module as recited in claim 1, wherein said control valve is a three-way valve.

4. The module as recited in claim 1, further comprising a controller that receives a feedback signal from said pressure transducer and provides a signal to move said control valve to the first position.

5. The module as recited in claim 1, wherein said control valve is actuated by a digital pulse.

6. The system as recited in claim 2, wherein said control valve is a three-way valve.

7. The system as recited in claim 2, further comprising a controller that receives a feedback signal from said pressure transducer and provides a signal to move said control valve to the first position.

8. The system as recited in claim 2, wherein said control valve is actuated by a digital pulse.

* * * * *